United States Patent Office 3,333,405
Patented Aug. 1, 1967

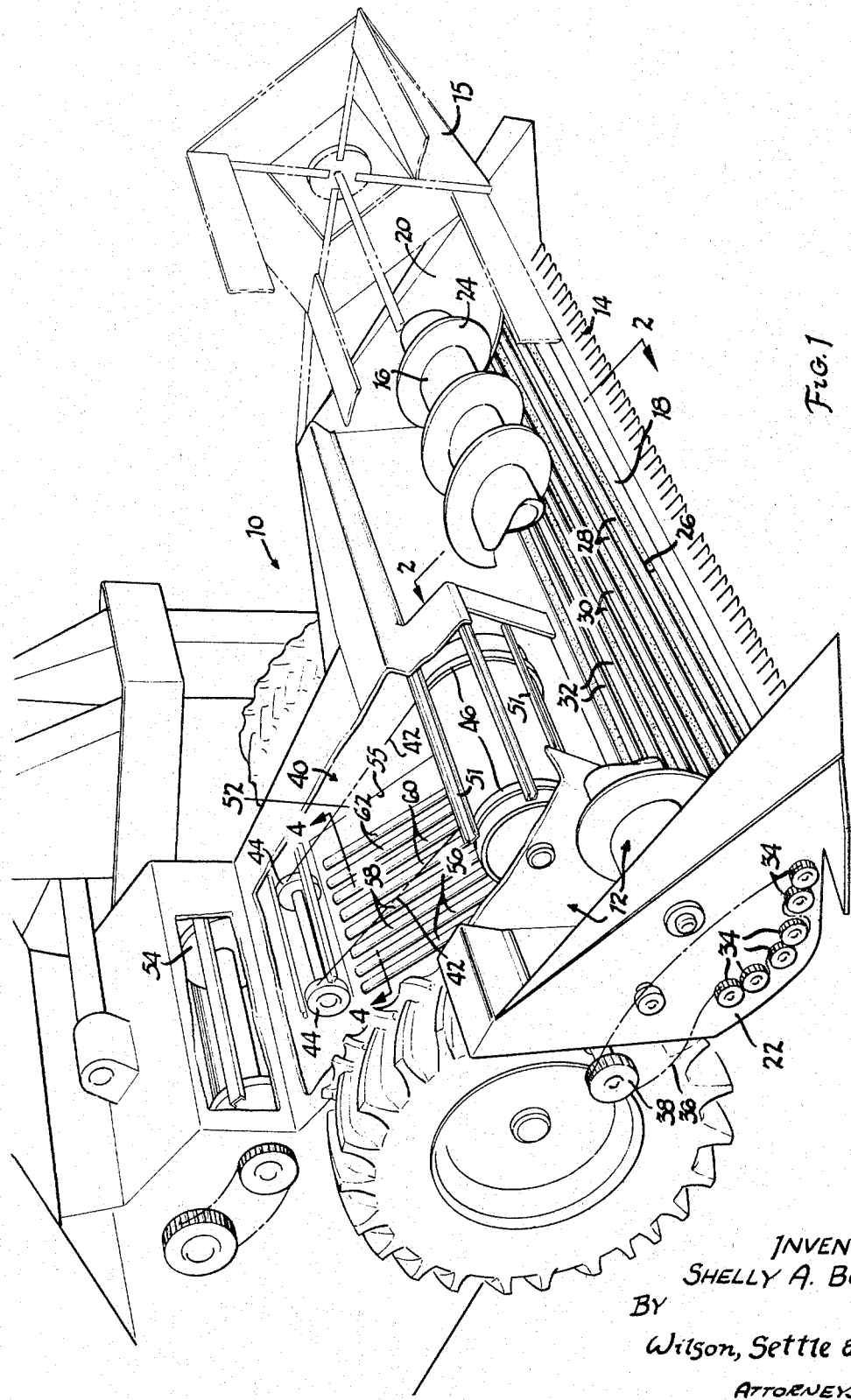

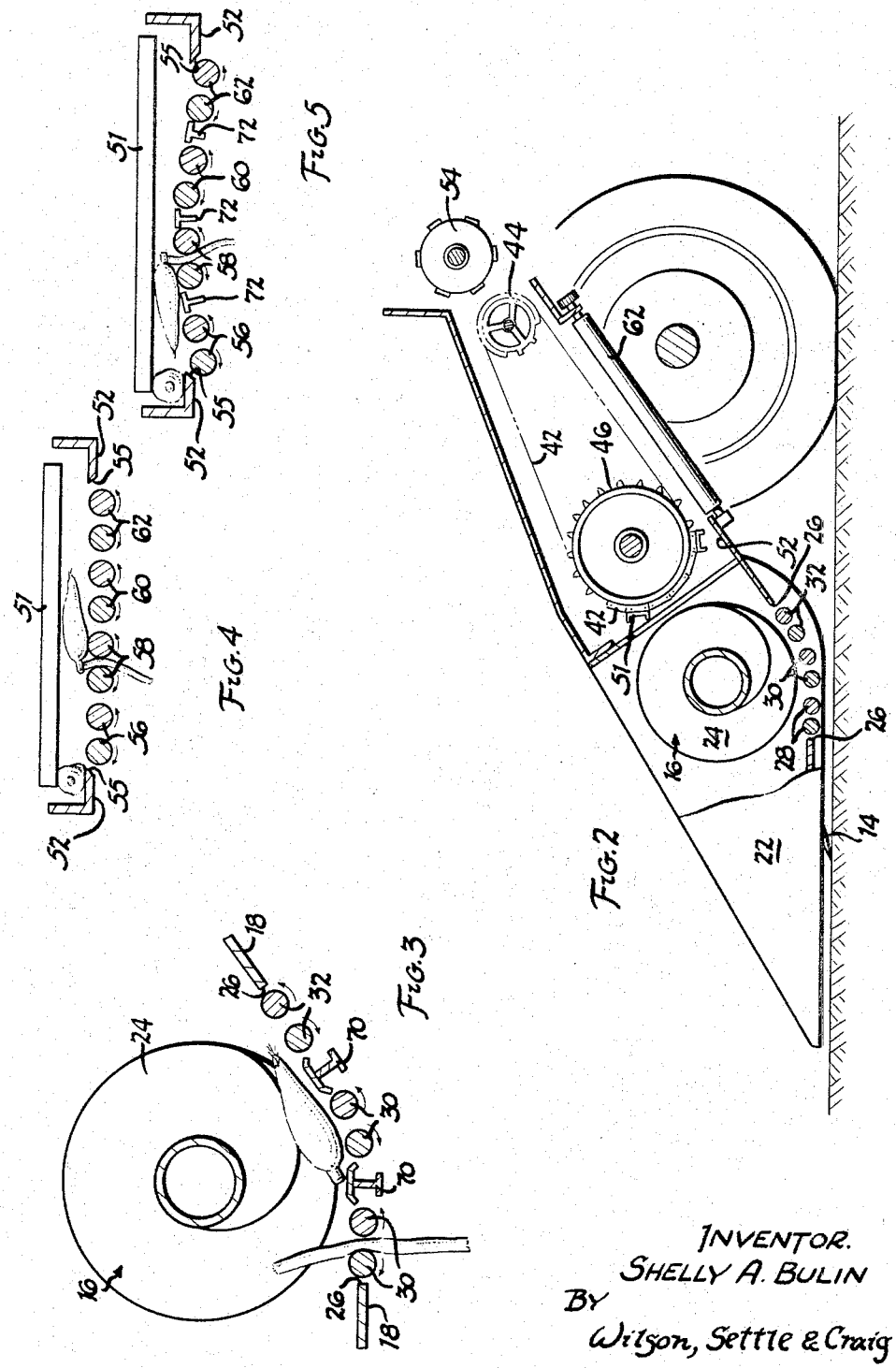

3,333,405
CORNSTALK EJECTOR FOR A COMBINE HEADER
Shelley A. Bulin, Davenport, Iowa, assignor to J. I. Case Company, Racine, Wis., a corporation of Wisconsin
Filed Jan. 11, 1965, Ser. No. 424,569
5 Claims. (Cl. 56—21)

ABSTRACT OF THE DISCLOSURE

A conventional combine header which has been converted for use as a corn picking header. The conventional header is modified to include a corn stalk ejector mechanism which is adapted to separate the ears from the corn stalks and feed the ears directly to the harvesting mechanism of a conventional combine while ejecting the stalks from the header onto the ground.

---

The present invention relates to a corn picking header for a combine and more particularly to a cornstalk ejector mechanism adapted to be used in conjunction with a standard combine header and a conventional combine, which stalk ejector mechanism functions to sever the ears of corn from the cut stalks and to eject the stalks from the header upon the ground.

In the past, several attempts to harvest corn by use of an existing combine, i.e. a combination harvesting and threshing machine, have been undertaken. Initial attempts to deliver all the stalks and ears to the interior of the combine proved to be impractical because the stalks and stalk foliage easily clogged the combine and left the threshed shelled corn unacceptably dirty. Hence, from the beginning of development for purposes of cleanliness, it became apparent that the stalks inherently had to be removed and ejected from the header before the ears were introduced into the interior of the combine for shelling of the corn kernels from the cobs.

The required stalk ejection, prior to delivery of the ears to the interior of the combine, was successfully achieved on a commercial basis by utilizing a modified existing combine. However, the standard combine header thereof had to be completely replaced by a special corn-harvesting header. Corn-harvesting headers of this type generally comprise a two row or four row picker equipped with fowardly projecting snouts which function to channel the standing corn-laden stalks to gathering chains, which chains, in turn, funnel the stalks into oppositely rotating snapping rolls. The snapping rolls pull the stalks down and through the rolls pinching off the ears, which ears are thereafter conveyed into the interior of the combine. For greater detail, reference may be made to United States Patents 2,794,307 and 2,787,106, each of which discloses a corn-harvesting header, of the type described, adapted for use in conjunction with a combine.

While a degree of commercial success has been achieved with corn-harvesting headers of the snapping rolls type, they are handicapped by several limiting deficiencies. The principal deficiencies are: (1) limited harvesting capacity, i.e. two or four row capacity per combine pass; (2) excessive corn loss, i.e., (a) ears are frequently shaken off upon the ground at the snouts in advance of the snapping rolls, (b) loose ears may be pushed through the snapping rolls by incoming stalks, (c) shelling corn occurs in the vicinity of the snapping rolls; and (3) above-all, the high installation cost required to completely replace the standard combine header with special corn-harvesting header.

This invention substantially overcomes the above-recited deficiencies of the prior art by providing apparatus and manipulative method steps for harvesting a plurality of rows of corn. A standard combine header is utilized but modified to include a pair of oppositely rotated rollers, drive-mounted in the header flow, i.e. in an auger trough and/or a feed deck, which rollers pinch the ears from the incoming stalks and eject the stalks upon the ground as the ears are conveyed up the feed deck into the interior of the combine for husking and shelling in a usual manner. A plurality of pairs of stalk ejecting rollers may also be utilized.

Accordingly, it is a primary object of the present invention to provide a cornstalk ejector used in conjunction with a standard header of a combine to accommodate simultaneous harvesting of a plurality of rows of standing corn, and to pinch off the ears of corn from the cut stalks as the stalks are being ejected through the header floor.

A further object is the provision of a stalk ejector attachment adapted to be mounted at the floor of a standard combine header to thereby greatly reduce the equipment investment cost required to harvest and shell corn with a combine.

Another important object is the provision of a cornstalk ejector mechanism which functions in conjunction with a conventional combine header to provide improved multi-row harvesting capacity.

Another important object of this invention is the provision of a conventional combine header, modified to include bed-mounted, power-driven rollers, for (1) simultaneously cutting a plurality of rows of corn, (2) pinching the ears of corn from the stalks, (3) delivering the ears into the combine cylinder or the like for shelling; and (4) rejecting the stalks and stalk foliage, to thereby deliver the corn to the cylinder in an acceptable state of cleanliness while avoiding significant corn loss in the region of the header during harvesting.

These and other objects featured by the present invention will become apparent from the following description and appended claims in conjunction with the accompanying drawings in which:

FIGURE 1 is a perspective view, partly broken away, of a conventional combine header equipped with stalk ejecting rollers disposed at the floor of the header across the auger trough and along the base of the feed deck;

FIGURE 2 is a cross-sectional view taken along line 2—2 of FIGURE 1 illustrating in greater detail the stalk ejecting rollers disposed across the base of the auger trough;

FIGURE 3 is a cross-sectional view similar to that of FIGURE 2 but illustrating the modified form of stalk ejector mechanism disposed at the base of auger trough;

FIGURE 4 is a cross-sectional view taken along line 4—4 of FIGURE 1 illustrating in greater detail the stalk ejecting rollers disposed along the base of the feed deck; and FIGURE 5 is a cross-sectional view similar to that of FIGURE 4 but illustrating a modified type of stalk ejector mechanism disposed along the base of the feed deck.

I am referring now to the drawings wherein like numerals are used to designate like parts throughout, and more particularly to the schematic representation of FIGURES 1 and 2, a presently preferred embodiment of this invention is illustrated. The apparatus schematically depicted in FIGURES 1 and 2 comprises a combine header 10 of conventional type modified to include stalk ejecting mechanism 12 for separating the ears of corn from the stalks after the stalks are cut and for discharging or ejecting the stalks from the header prior to introduction of the ears of corn into the interior of the combine for husking and shelling.

Absent the stalk ejecting mechanism 12, the header 10 and the combine per se upon which header 10 is mounted, may be any standard combine header and combine as, for example, the combine header and the self-propelled combine disclosed in United States Patent 2,681,542, assigned to the assignee of the present invention and to which reference may be made if so desired.

The header is preferably pivotably supported at the upper and rearward end of the header by the forward end of the combine (not fully shown) so that the lower end of the header which carries a sickle 14 and, if desired, a reel 15, may be raised and lowered with respect to the ground.

The header 10 provides a suitable auger 16 disposed above a suitable auger trough 18 which forms part of the floor of the header 10. Preferably auger 16 has a single shaft journaled in sidewalls 20 and 22 of the auger trough 18, and includes helical convolutions 24 of any desired size and configuration. Normally, oppositely pitched bladelike convolutions 24, i.e. having left and righthand helical leads, respectively, are placed on opposite halves of the auger 16 so that the auger 16 functions to cut cornstalks which are delivered to the trough under the auger toward the center of the trough.

The auger trough 18 (FIGURE 1) is provided with an elongated opening 26 extending essentially parallel to the auger 16, and, therefore, is disposed essentially transverse of the movement of the combine. A plurality of pairs of spaced stalk ejecting rollers in this instance, three pairs, namely 28, 30 and 32, are situated at the opening 26 in the auger trough 18. The pairs of rollers 28, 30 and 32 are rotatably journaled in the sidewalls 20 and 22 of auger trough 18 in any desired manner, so that the rollers of each roller pair may be oppositely rotated for the purposes of engaging incoming cornstalks, pulling the stalks through the rollers so as to pinch off the ears leaving the ears in the auger trough for further processing through the combine and depositing of the cornstalks up on the ground. By ejecting the cornstalks from the header, the ears of corn remain relatively clean as they are further processed through the combine. To accomplish the foregoing purposes, one end of each of the rollers 28, 30 and 32 is provided with a sprocket 34, which sprockets are power-driven by a chain 36 actuated from the engine powered reel drive sprocket 38 or the like.

The header 10 is equipped with a feed rake 40 which preferably comprises a pair of endless chains 42 which are each reeled about an upper driving sprocket 44 and a lower driven sprocket 46. The lower active run (FIGURE 2) of the feed rake 40 travels upward at a slight distance above a feed deck 52, which also forms part of the floor of the header 10. The feed deck 52 extends approximately from the center portion of the auger trough to the entrance into the interior of the combine at threshing cylinder 54.

The harvested corn, less the ejected cornstalks which were ejected through rollers 28, 30 and 32 at the auger trough opening 26, is fed upwardly beneath the feed rake in a manner disclosed in the United States Patent 2,681,542, to which reference has already been made. The feed rake is substantially entirely enclosed within the feeder housing and is necessarily open at the front to receive the harvested corn being fed from the auger trough.

The feed deck 52 is provided with an opening 54 at which are situated additional pairs of oppositely rotatable stalk ejecting rollers, in this case four pairs namely 56, 58, 60 and 62.

Of course, only rollers at the auger trough, such as 28, 30 and 32, or alternatively, rollers at the feed deck, such as 56 through 62 inclusive, may be utilized if desired.

Stalk ejecting rollers 56, 58, 60 and 62 extend essentially parallel to the direction of movement of the combine and are disposed in a plane parallel with the plane which contains the feed deck 52. The rollers 56, 58, 60 and 62 are rotatably journaled to the frame of the header 10 in any desired manner (not shown) and are power-driven, for example, by a chain and sprocket drive system powered by the engine of the combine (not shown). Any residual cornstalks not ejected through the stalk ejecting rollers 28, 30 and 32 disposed at the floor of the auger trough 18 are caught by and ejected from the header 10 through the oppositely rotating rollers 56, 58, 60 and 62. Thus, only the clean ears of corn are delivered to the interior of the combine for husking and shelling.

The manner in which husking and shelling takes place within the combine forms no part of the present invention and consequently a description thereof is omitted. Any conventional combine system for husking and shelling the corn may be utilized in conjunction with the corn ejector system of the present invention.

The opening 26 in the auger trough 18 may be divided into a series of elongated slots as, for example, by structural members 70 (FIGURE 3). Structural members 70 may be of any desired cross-sectional configuration but are illustrated in FIGURE 3 as being T-shaped to provide needed structural rigidity and to prevent deflection. The members 70 function to prevent shelling of the ears of corn which might otherwise be occasioned by ears of corn falling between and being abraded by one roller 28 and one roller 30, or by one roller 30 and one roller 32.

Similarly beams 72 (FIGURE 5) may be used to prevent the same shelling effect when the ears of corn are situated against any two non-paired rollers of the respective pairs of rolls, 56, 58, 60 and 62. Also, the rollers 56, 58, 60 and 62 may be arranged in a convex pattern as illustrated in FIGURE 5 so as to urge the ears of corn, once severed from their respective stalks, toward the sidewalls adjacent the feed deck 52. This pattern of movement minimizes the surface-to-surface contact between the turning rollers and the corn and thereby minimizes the shelling effect. Thereafter, the slats 51 of the feed rake 40 convey the independent ears of corn to the combine interior.

The present invention may be modified by the addition of cams to vary the spacing between each pair of corn ejecting rollers and also if desired one roller of each pair may be provided with an elastomeric coating to enhance the rollers gripping characteristics, thereby facilitating ease of stalk ejectment.

Thus, it is seen that the present invention provides a system for modifying an existing conventional combine header by the appropriate addition of stalk ejecting rollers or like means to thereby supply a low cost corn-harvesting unit. Any number of pairs of stalk ejecting rollers may be used at the floor of the header with the advantage being: (1) the modification may be made at a surprisingly low cost to the farmer; (2) full replacement of the combine header is not required; (3) harvesting corn utilizing this invention substantially reduces crop loss due to shelling, falling ears and the like; and (4) an increased harvesting capacity is provided with the present invention to accommodate harvesting of as many as eight rows of corn per combine pass.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a corn harvester header for use with a combine having a threshing mechanism, said header having a cutting mechanism, an auger, an auger trough, a feed deck and a feed rake for cutting corn-laden stalks and delivering ears of corn from said stalks to said threshing mechanism, the improvement comprising means defining an opening in at least one of said auger trough and said feed deck and spaced power-driven rotary means disposed in said opening for severing the ears of corn from said stalks and ejecting said stalks through said opening with said ears being fed to the threshing mechanism.

2. A corn harvester head as defined in claim 1, wherein said spaced power-driven rotary means includes a plurality of spaced pairs of rollers, with each roller of the pair of rollers rotated in opposite directions and means interposed between adjacent pairs of rollers to restrict the opening therebetween.

3. A corn harvester head as defined in claim 1, wherein said opening is formed in said auger trough and said rotary means are journaled on an axis substantially parallel to the axis of said auger.

4. A corn harvester head as defined in claim 1, further including means defining a second opening in the other of said auger trough and said feed deck and second spaced power-driven rotary means in said second opening for severing the remaining corn stalks from said ears and ejecting the remaining corn stalks from the header while feeding said ears to the threshing mechanism.

5. A combine header for a combine having a threshing cylinder, a sickle, and an arcuate floor intermediate the sickle and the threshing cylinder, the improvement comprising an auger overlying the arcuate floor for conveying ear-laden stalks cut by the sickle toward the threshing mechanism, means defining an opening in said floor, at least two rollers disposed in said opening and power means for driving said rollers in opposite directions, the rollers having their axes parallel to the auger axis and defining therebetween a nip into which the auger urges the ear-laden stalks, thereby ejecting the stalks through said floor opening.

References Cited

UNITED STATES PATENTS

| | | | |
|---|---|---|---|
| 850,390 | 4/1907 | McClure et al. | 56—15 |
| 1,978,968 | 10/1934 | Steel | 56—104 |
| 2,515,808 | 7/1950 | Stoddard | 56—18 |
| 2,681,542 | 6/1954 | Heth | 56—124 |
| 3,126,691 | 3/1964 | Krahn et al. | 56—2 |

A. F. GUIDA, *Assistant Examiner.*

ABRAHAM G. STONE, *Primary Examiner.*